United States Patent [19]
Ito

[11] Patent Number: 4,996,611
[45] Date of Patent: Feb. 26, 1991

[54] TAPE POSITION DATA INDICATING APPARATUS FOR CASSETTE TAPE PLAYER

[75] Inventor: Masahiro Ito, Saitama, Japan

[73] Assignee: Kabushiki Kaisha Toshiba, Kanagawa, Japan

[21] Appl. No.: 238,220

[22] Filed: Aug. 30, 1988

[30] Foreign Application Priority Data

Aug. 31, 1987 [JP] Japan .................. 62-216648

[51] Int. Cl.$^5$ ............................................ G11B 15/18
[52] U.S. Cl. ................................... 360/72.3; 360/137
[58] Field of Search ................. 360/137, 72.1–72.3, 360/73.01, 73.14; 242/201, 203; 318/6, 7

[56] References Cited

U.S. PATENT DOCUMENTS

| 4,172,231 | 5/1982 | d'Arc et al. | 360/72.3 X |
| 4,280,159 | 4/1982 | Nakayama | 360/137 |
| 4,347,538 | 8/1982 | Klank | 360/137 |
| 4,410,923 | 10/1983 | Patel | 360/137 |
| 4,411,008 | 10/1983 | d'Arc et al. | 360/137 X |
| 4,494,711 | 1/1985 | Van Pelt | 360/73.04 X |

FOREIGN PATENT DOCUMENTS 56-49385 11/1981 Japan .
59-217279 4/1985 Japan .
60-52990 7/1985 Japan .
60-106094 10/1985 Japan .
2116760-A 9/1983 United Kingdom .

OTHER PUBLICATIONS

German Offenlegungsschrift No. 2853025 published Jun. 16, 1979.
German Offenlegungsschrift No. 3318324 A1 published Nov. 24, 1983.

Primary Examiner—David J. Severin
Attorney, Agent, or Firm—Finnegan, Henderson, Farabow, Garrett, and Dunner

[57] ABSTRACT

A tape position data indicating apparatus for a cassette tape player wherein a tape is wound between a supply reel and a take-up reel. The apparatus includes a reel base for rotating the take-up reel for transporting the tape from the supply reel to the take-up reel, a detector for detecting a rotation period of either of the reels, a calculating circuit responsive to the rotation period detected by the detector for obtaining an approximated tape position data according to a prescribed linear equation, an indicator for indicating the approximated tape position data, a ROM memory for storing prescribed constants associated with the linear equation and circuit for supplying the prescribed linear equation constants stored in the ROM memory to the calculating circuit.

18 Claims, 4 Drawing Sheets

TAPE POSITION DATA INDICATING APPARATUS FOR CASSETTE TAPE PLAYER

FIELD OF THE INVENTION

The present invention relates generally to a tape position data indicating apparatus, and more particularly, to an apparatus for indicating data of a tape wound on tape reel for a cassette tape player.

BACKGROUND OF THE INVENTION

A tape player such as a video tape recorder (referred as VTR hereafter) or an audio tape recorder typically includes a tape position data indicator. The tape position data indicator indicates data corresponding to a tape position of the tape wound on a supply reel or a take-up reel of a cassette tape. The data corresponding to the tape position will be referred as the tape position data hereafter.

The tape position data represents either one of a remaining tape length wound yet on the supply reel, a past tape length wound already on the take-up reel, a remaining tape play time corresponding to the remaining tape length, a past tape play time corresponding to the past tape length or ratios such as percentages of the tape lengths or the tape play times. The tape position data can be obtained by measuring a volume of tape wound on the supply reel or the take-up reel. The tape volume is obtained by measuring, for example, the diameter of the tape part wound on the reel.

Figure 1:
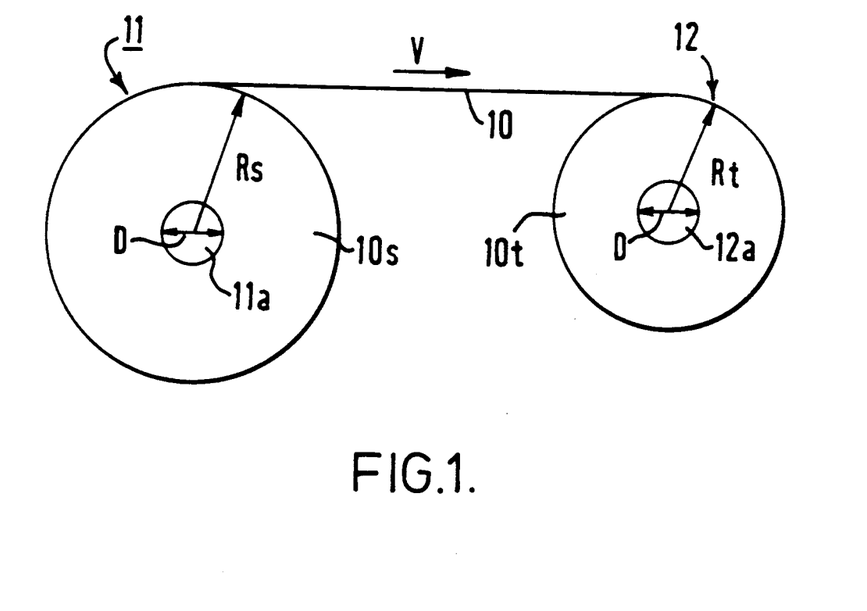
FIG. 1 is an explanatory drawing showing a typical example of cassette tapes.

Referring now to FIG. 1, a typical calculation for obtaining the tape position data will be described. FIG. 1 diagrammatically shows a content of cassette tapes. As shown in FIG. 1, a tape 10 is wound between a supply reel 11 and a take-up reel 12 of the cassette tape. Here it is assumed that reel hubs 11a and 12a of the supply reel 11 and the take-up reel 12 have a same diameter D, a tape part 10s on the supply reel 11 is wound at a radius Rs and another tape part 10t on the take-up reel 12 is wound at a radius Rt. Then, following relations are established.

$$Rs = Ns \cdot Th + \frac{D}{2} \quad (1)$$

$$Rt = Nt \cdot Th + \frac{D}{2} \quad (2)$$

wherein Ns is winding turns of the tape part 10s wound on the supply reel 11, Nt is winding turns of the tape part 10t wound on the take-up reel 12 and Th is a thickness of the tape 10.

Tape lengths Ls and Lt of the tape parts 10s and 10t are obtained as follows:

$$Ls = \int_0^{Ns} \pi \cdot Rs \cdot dN = \pi \cdot (Th \cdot Ns^2 + D \cdot Ns) \quad (3)$$

$$Lt = \int_0^{Nt} \pi \cdot Rt \cdot dN = \pi \cdot (Th \cdot Nt^2 + D \cdot Nt) \quad (4)$$

The tape winding turns Ns and Nt of the tape parts 10s and 10t are obtained from Equations (3) and (4) as follows:

$$Ns = \frac{1}{2} \cdot \left( -\frac{D}{Th} + \sqrt{\left(\frac{D}{Th}\right)^2 + \frac{4 \cdot Ls}{\pi \cdot Th}} \right) \quad (5)$$

$$Nt = \frac{1}{2} \cdot \left( -\frac{D}{Th} + \sqrt{\left(\frac{D}{Th}\right)^2 + \frac{4 \cdot Lt}{\pi \cdot Th}} \right) \quad (6)$$

Generally, a tape speed V of the tape 10 running from the supply reel 11 to the take-up reel 12 is given by differentiating the length L of the tape 10 with respect to a time t. That is, the tape speed V is given as a differential equation of V=dL/dt. Rotation periods Ps and Pt of the supply reel 11 and the take-up reel 12 are obtained from a reciprocal of the tape speed V. Thus, the rotation periods Ps and Pt are obtained as follows:

$$Ps = \frac{1}{V} = \frac{dt}{dL} = \frac{\pi \cdot D^2}{Ns} \cdot \sqrt{1 + \frac{4 \cdot Ls \cdot Th}{\pi \cdot D^2}} \quad (7)$$

$$Pt = \frac{1}{V} = \frac{dt}{dL} = \frac{\pi \cdot D^2}{Nt} \cdot \sqrt{1 + \frac{4 \cdot Lt \cdot Th}{\pi \cdot D^2}} \quad (8)$$

The tape lengths Ls and Lt of the tape parts 10s and 10t wound on the supply reel 11 and the take-up reel 12 are obtained from Equations (7) and (8) as follows:

$$Ls = \frac{Ps^2 \cdot V^2}{4\pi \cdot Th} - \frac{\pi \cdot D^2}{Th} \quad (9)$$

$$Lt = \frac{Pt^2 \cdot V^2}{4\pi \cdot Th} - \frac{\pi \cdot D^2}{Th} \quad (10)$$

The thickness Th of the tape 10 and the diameter D of the reel hubs are defined by every type of cassette tapes, e.g., T-30 type cassette tape, T-60 type cassette tape, T-120 type cassette tape, etc. Accordingly, the tape lengths Ls and Lt of the tape parts 10s and 10t wound on the supply reel 11 and the take-up reel 12 can be calculated by measuring the rotation periods Ps and Pt, provided that the data designating the type of the cassette tape are set in the tape player and the tape speed V are previously known.

The tape lengths Ls, Lt of the tape part 10s, 10t wound on the reels 11, 12 are obtained by calculations of Equation (9), (10), as described above.

Conventionally, the above calculations of Equation (9), (10) are carried out by a microcomputer. Data associated with the cassette tape type, i.e., data designating the reel hub diameter D and the tape thickness Th and a data associated with the tape speed mode, i.e., a data designating the tape speed V are previously stored in a memory such as a ROM (Read Only Memory) associated to the microcomputer. The tape speed modes include a normal speed mode, a fast speed mode, a slow speed mode, etc.

The microcomputer is required to have a large scale of capacity for calculation of quadratic equations such as Equations (5), (6). Furthermore, in typical tape players, the microcomputer carries out not only the calculation of tape position, but also other operations for controlling the tape player. Then the capacity scale of the microcomputer increases more and more. Or varieties of the cassette tape types and the tape speed modes available for the calculation of the tape position are restricted.

SUMMARY OF THE INVENTION

It is, therefore, an object of the present invention to provide an apparatus for indicating a tape position data for a cassette tape player in which a microcomputer for calculating the tape position data is able to have a reduced capacity.

Another object of the present invention to provide an apparatus for indicating a tape position data for a cassette tape player which is able to cope with many types of cassette tapes or many of tape speed modes.

In order to achieve the above objects, an apparatus for indicating tape position for a cassette tape player according to one aspect of the present invention includes a reel base for rotating the take-up reel for transporting the tape from the supply reel to the take-up reel, a detector for detecting a rotation period of either of the reels, a calculating circuit responsive to the rotation period detected by the detector for obtaining an approximated tape position data according to a prescribed linear equation, an indicator for indicating the approximated tape position data, a ROM memory for storing prescribed constants associated with the linear equation and circuit for supplying the prescribed linear equation constants stored in the ROM memory to the calculating circuit.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 2, 3 and 4. Throughout drawings, reference numerals or letters used in the description of the prior art will be used to designate like or equivalent elements for simplicity of explanation.

Figure 2:
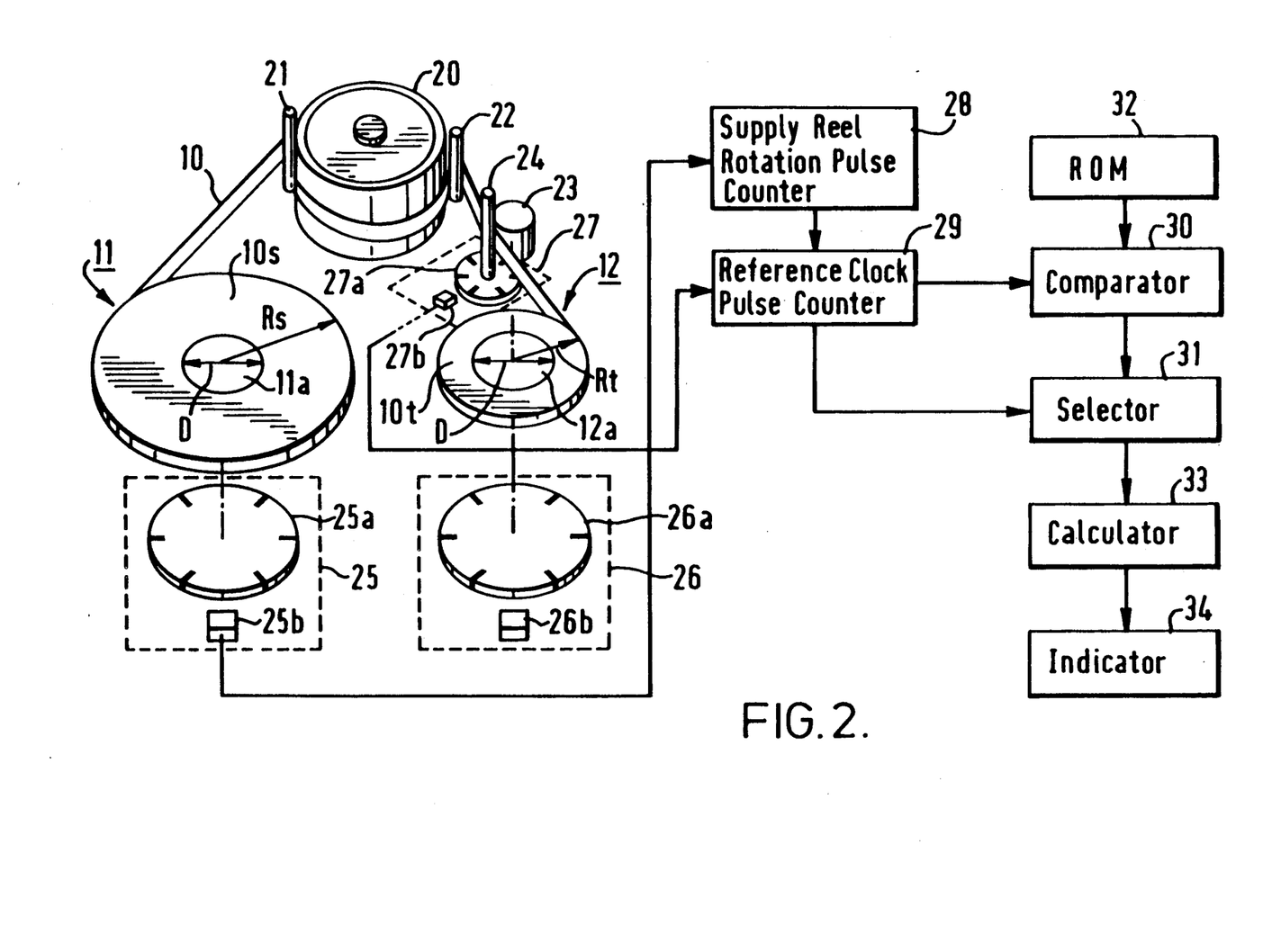
FIG. 2 is an explanatory drawing showing a first embodiment of the tape position data indicating apparatus according to the present invention applied for a VTR.

Referring now to FIG. 2, a first embodiment of the apparatus for indicating tape position data applied for a cassette tape player, e.g., a VHS system VTR according to the present invention will be described in detail. FIG. 2 shows a tape transport system of a VTR incorporating the first embodiment of the tape position data indicating apparatus according to the present invention.

In FIG. 2, a supply reel 11 and a take-up reel 12 are housed in a video cassette tape (not shown). A tape 10 is wound on between reel hubs 11a and 12a of the supply reel 11 and the take-up reel 12. When the video cassette tape is set in a VTR, the supply reel 11 and the take-up reel 12 engage with corresponding reel bases, i.e., a supply reel base and a take-up reel base (not shown) of the VTR. The tape 10 is transported from the supply reel 11 to the take-up reel 12 as the reel hub 12a of the take-up reel 12 is driven through the take-up reel base.

When the VTR is in either a recording mode or a reproducing mode, the tape 10 is loaded on around a cylinder 20 having a rotary head device (not shown). This is effected by predetermined operations of tape guides 21 and 22. In the loading state, a pinch roller 23 presses the tape 10 against a capstan 24. The transportion of the tape 10 from the the supply reel 11 to the take-up reel 12 starts when the tape loading is completed.

A pair of reel rotation detectors 25, 26 and a reference clock generator 27 are provided in associated with the reel bases for the supply reel 11 and the take-up reel 12 and the capstan 24, respectively. The reel rotation detectors 25, 26 and the reference clock generator 27 are constituted by conventional frequency generators. The frequency generator comprises a rotary magnet disc and a magnetic sensor. The rotary magnet disc has a plurality of magnets (six magnets in this embodiment) on its circumference. The magnetic sensor generates pulses in response to the magnets in rotation.

A rotary magnet disc 25a of the frequency generator type supply reel rotation detector 25 is associated with the supply reel base. Thus, the supply reel rotation detector 25 generates pulses whose duration varies in accordance with the rotation state of the supply reel 11. A magnetic sensor 25b of the detector 25 is coupled to a supply reel rotation pulse counter 28 for supplying the supply reel rotation detecting pulses.

A rotary magnet disc 27a of the frequency generator type reference clock generator 27 is associated with the capstan 24. Here the capstan 24 rotates at a prescribed constant speed. Therefore, the frequency generator associated with the capstan 24 operates as a reference clock generator. Thus, the reference clock generator 27 generates the reference clock pulses. A magnetic sensor 27b of the reference clock generator 27 is coupled to a reference clock pulse counter 29 for supplying the reference clock pulses.

A rotary magnet disc 26a of the frequency generator type take-up reel rotation detector 26 is associated with the take-up reel base. Thus, the take-up reel rotation detector 26 generates pulses whose duration varies in accordance with the rotation state of the take-up reel 12. A magnetic sensor 26b of the detector 26 can be coupled to a suitable pulse counter (not shown) for counting take-up reel rotation detecting pulses in similar to the supply reel rotation detector 25, if necessary. That is, the first embodiment of the present invention is adapted for indicating tape position data relating a remaining tape part wound on the supply reel 11. If an indication of tape position data relating a past tape part already transported to the take-up reel 12 is requested, a pulse counter similar to the supply reel rotation pulse counter 28 can be easily provided for counting the take-up reel rotation detecting pulses.

The supply reel rotation pulse counter 28 is coupled to the reference clock pulse counter 29 for supplying the supply reel rotation detecting pulses to the reference clock pulse counter 29. The reference clock pulse counter 29 latches the reference clock pulses when a prescribed number of the supply reel rotation detecting pulses. Accordingly, the number of the reference clock pulses thus latched varies in response to a rotation speed of the supply reel 11. That is, a large number of the reference clock pulses are latched when the supply reel 11 rotates at a relatively slow speed. While a small number of the reference clock pulses are latched when the supply reel 11 rotates at a relatively fast speed. The number of reference clock pulses thus latched in the reference clock pulse counter 29 is used as a measured value Km of the rotation of the supply reel 11.

The measured value Km is supplied to a comparator 30 and a selector 31. The comparator 30 is coupled to a ROM 32 to receive prescribed preset data stored therein. An output of the comparator 30 and the measured value Km from the reference clock pulse counter 29 are applied to the selector 31. A selected output of the selector 31 is applied to a remaining tape play time calculator 33. An output of the remaining tape play time calculator 33 is applied to an indicator 34. The comparator 30, the selector 31 and the remaining tape play time calculator 33 are constituted by a microcomputer. The ROM 32 is coupled to the microcomputer for supplying necessary preset data to the microcomputer. Details of the operation carried out by the comparator 30, the selector 31, the ROM 32, the remaining tape play time calculator 33 and the indicator 34 will be described later.

Now, a grouping of video cassette tapes for the VHS system VTR will be described. Video cassette tapes presently in use for the VHS system VTR can be divided in three groups, based on both a difference of the diameter of reel hubs and a difference of the thickness of tapes.

First, T-30 and T-60 type video cassette tapes have large diameter reel hubs and a thick tape. Now these first type video cassette tapes are assigned to the group X. Second, T-120 type video cassette tapes have small diameter reel hubs and a thick tape. Now these second type video cassette tapes are assigned to the group Y. Third, T-140 and T-160 type video cassette tapes have small diameter reel hubs and a thin tape. Now these third type video cassette tapes are assigned to the group Z.

Now, a relation between a remaining tape play time Tr and a rotation period Ps of supply reel of a video cassette tape will be described. FIG. 3 is a graph showing a response of the remaining tape play time Tr to the rotation period Ps of supply reel in the T-120 type video cassette tape in the group Y. A graph Gr of the remaining tape play time Tr actually has a quadratic curve according to the quadratic equations as above-mentioned.

Figure 3:
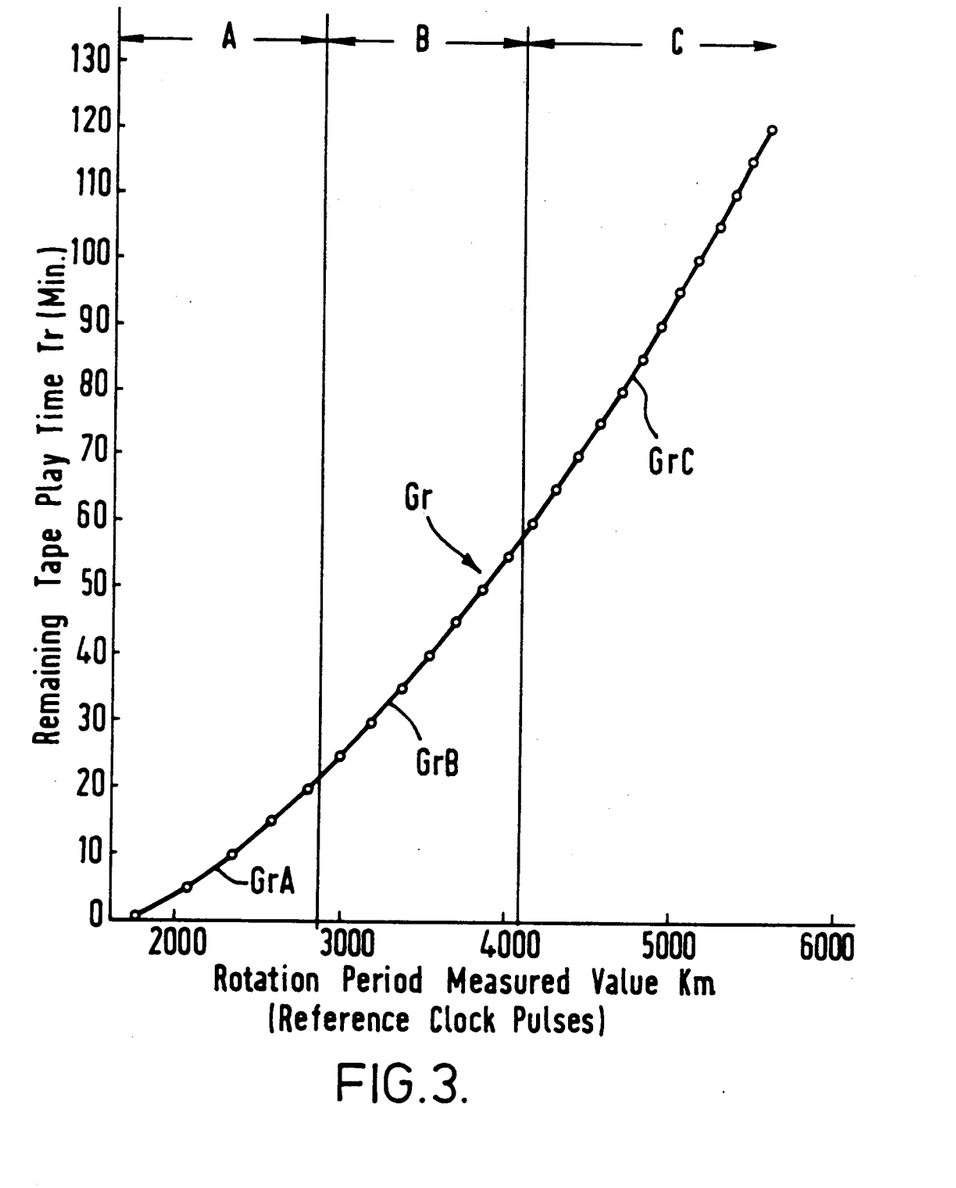
FIG. 3 is a graph showing a typical characteristics of a remaining tape play time responsive to a rotation period of supply reels.

In FIG. 3, the rotation period Ps taken on the abscissa is represented by the number of reference clock pulses Km supplied from the reference clock generator 27 to the reference clock pulse counter 29 per one rotation of the supply reel 11. The frequency of the reference clock pulses is 720 Hz.

If the abscissa in FIG. 3 is divided to three sections A, B and C, respective graph parts GrA, GrB and GrC in the sections A, B and C can be approximated to straight line graphs at a relatively high accuracy, respectively.

Figure 4:
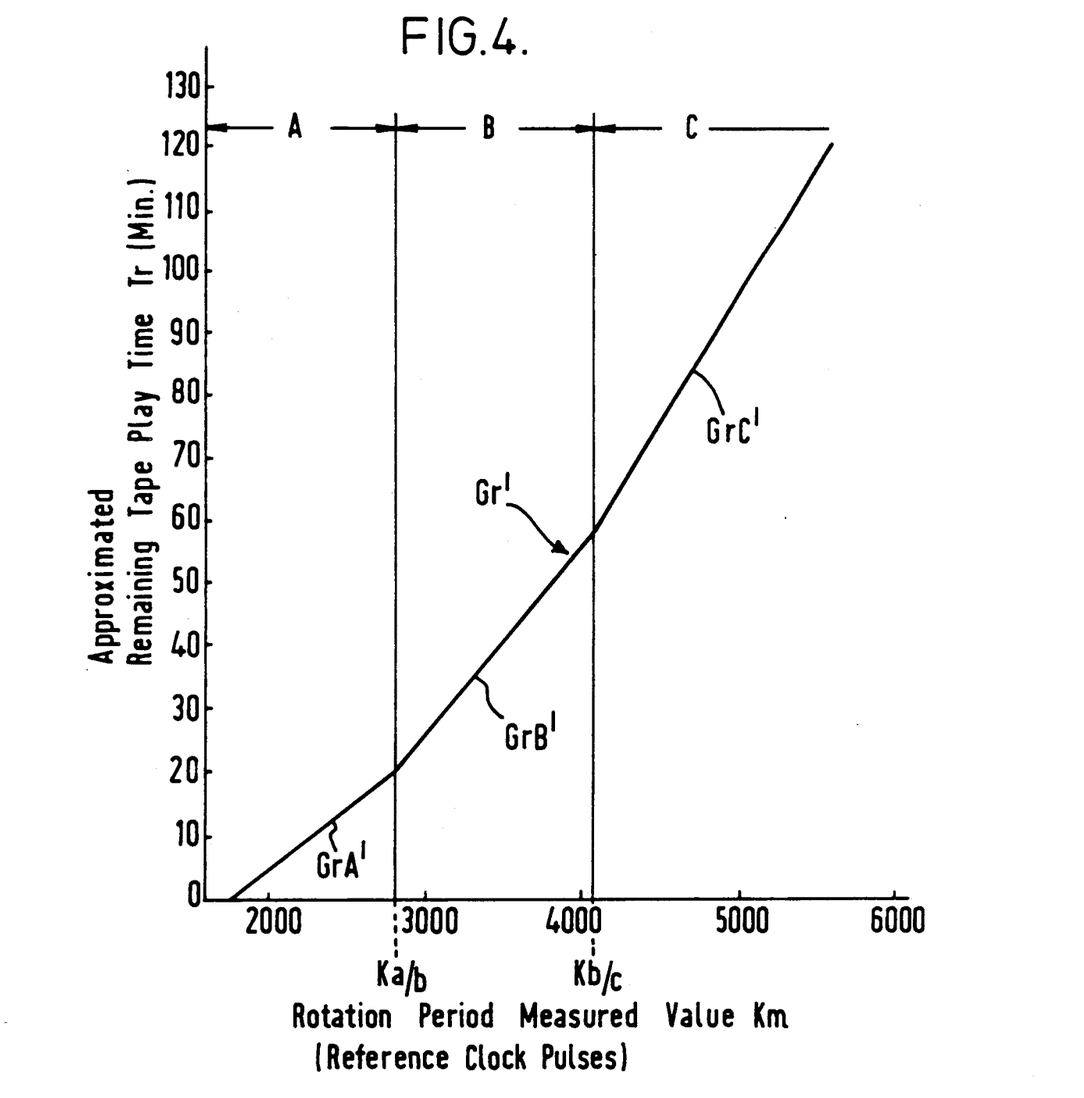
FIG. 4 is a graph showing an approximated characteristics of a remaining tape play time responsive to a rotation period of supply reels according to the present invention.

Thus another graph, as shown in FIG. 4, is obtained. In FIG. 4, an approximated graph Gr' corresponds to the graph Gr in FIG. 3. Respective approximated graph parts GrA', GrB' and GrC' in the sections A, B and C correspond to the graph parts GrA, GrB and GrC in FIG. 3. Thus, the approximated graph Gr' takes a folded line graph, as shown in FIG. 4.

The approximated graph Gr' of FIG. 4 represents an approximated response of the remaining tape play time Tr to the rotation period Ps of supply reel in the T-120 type cassette tapes of the group Y. As to the other type cassette tapes of the groups X and Z, every response of the remaining time Tr to the rotation period Ps can also be approximated to other folded line graph, similar to the approximated graph Gr' in FIG. 4.

The group X, Y, or Z can be judged by a manner as disclosed in the co-pending U.S. patent application Ser. No. 07/158,684 filed on Feb. 22, 1988, which is assigned to the same assignee of the present invention, when a video cassette tape is set in the VTR. That is, the sum of the squares of the rotation periods Ps and Pt of the supply reel and the take-up reel, i.e., $Ps^2 + Pt^2$, becomes constant in every type of the cassette tape. The sum of the squares will be referred as square sum hereafter for the simplicity of explanation. Thus, the group X, Y, or Z is judged by measuring the rotation periods Ps and Pt for every cassette tape set in the VTR and calculating the square sum.

Referring again to FIG. 2, the judgement of the group X, Y, or Z is carried out by the comparator 30. The comparator 30 compares a first square sum obtained from the cassette tape presently set in the VTR and a second square sum supplied from the ROM 32. The ROM 32 stores the preset square sum and other data, as described before. The first square sum is supplied to the comparator 30 through the reference clock pulse counter 29. Thus, the group X, Y, or Z of corresponding cassette tape presently set in the VTR is judged by the comparator.

The output of the comparator representing the group X, Y, or Z is applied to the selector 31. Now, it is assumed that the T-120 type cassette tape is set in the VTR so that the data representing the group Y is supplied from the comparator 30. The selector 31 reads out boundary data Ka/b, Kb/c from the ROM 32 directly or through the comparator 30. The boundary data Ka/b, Kb/c divide the abscissa in FIG. 3, i.e., the coordinate axis indicating the rotation period Ps of the supply reel 11, to three sections A, B and C, as described before. For example, the boundary data Ka/b divides the sections A and B at the value of about 2750. The boundary data Kb/c divides the sections B and C at the value of about 4050. The boundary data Ka/b, Kb/c have other values in the other group X and Z. The values of the boundary data Ka/b, Kb/c are also stored in the ROM 32.

Selector 31 selects the approximated graph parts GrA', GrB' and GrC' in response to the measured value Km for the rotation period Ps, i.e., the number of the reference clock pulses latched by the reference clock pulse counter 29. The selection of the approximated graph parts GrA', GrB' and GrC' is carried out as follows.

The selector 31 reads out a first abscissa cross constant $\alpha A$ and a first slope constant $\beta A$ associated with the section A from the ROM 32, directly or through comparator 30, when the measured value Km is less than the boundary data Ka/b. The selector 31 reads out a second abscissa cross constant αB and a second slope constant βB associated with the section B from the ROM 32, when the measured value Km is between the boundary datas Ka/b and Kb/c. The selector 31 reads out a third abscissa cross constant αC and a third slope constant βC associated with the section C from the ROM 32, when the measured value Km is more than the boundary data Kb/c. The first, second and third abscissa cross constants αA, αB and αC and the first, second and third slope constants βA, βB and βC are also stored in the ROM 32.

The first, second and third abscissa cross constants αA, αB and αC and the first, second and third slope constants βA, βB and βC have different values for every group X, Y and Z. Table in below shows the values stored in the ROM 32 for the group Y.

| Abscissa Cross Constant α | | | Slope Constant β | | |
|---|---|---|---|---|---|
| αA | αB | αC | βA | βB | βC |
| 1830 | 2130 | 2680 | 50 | 34 | 24 |

The measured value Km, a selected abscissa cross constant αA, αB or αC and a selected slope constant βA, βB or βC are applied to the remaining time calculator 33. The remaining time calculator 33 carries out a calculation for the following equation:

$$Tr = \frac{Km - \alpha}{\beta} \quad (11)$$

Thus, the remaining tape play time Tr is obtained. As Equation (11) is a simple linear equation, the calculation is carried out in a simple manner.

The remaining tape play time Tr obtained by the remaining time calculator 33 is supplied to the indicator 34. The indicator 34 indicates the remaining tape play time Tr.

The above explanation has been made in the case of the T-120 type video cassette tape belonging to the group Y. Remaining tape play time Tr for other type video cassette tapes belonging to the other groups X and Z are also obtained in a similar manner to the T-120 type video cassette tape of the group Y.

Video cassette tapes belonging to the group X, e.g., T-30 and T-60 type cassette tapes have a large diameter reel hub and a thick tape, as described before. Then, a graph showing the actual response of the remaining tape play time Tr to the rotation period Ps in the group X is closer to a straight line graph than that of the graph of the group Y. Accordingly, the graph is able to be approximated as a single linear graph or a folded line graph folded to two graph parts.

Video cassette tapes belonging to the group Z, e.g., T-160 and T-200 type cassette tapes have a small diameter reel hub and a thin tape, as described before. Then, a graph showing the actual response of the remaining tape play time Tr to the rotation period Ps in the group Z is larger in curvature than that of the graph of the group Y. Accordingly, the graph is better to be approximated as a folded line graph folded to four or more graph parts.

In each approximated graph part, e.g., the graph part GrA', GrB', GrC', the slope is constant. Then the remaining tape play time Tr linearly varies in response to the rotation period Ps. Thus the remaining tape play time Tr can be obtained by adding a variable defined by the rotation period Ps to a prescribed base value given for every graph part, in place of the calculation of Equation (11).

The embodiment described above can be changed to many modifications as follows. For example, the rotation period Ps can be obtained from the take-up reel rotation detector 26 for the take-up reel 12. The tape position data indicating apparatus can indicate a past tape play time in place of the remaining tape play time Tr. The past tape play time is obtained by detecting the rotation of the take-up reel 12. The apparatus is further able to indicate the length of the tape part 10a, or 10b wound on the supply reel 11 or the take-up reel 12. The apparatus also is able to indicate ratios such as percentages of the tape length wound on the reels or the tape play times to the entire length or the entire tape play time of cassette tapes.

As described above, the tape position data such as the remaining tape play time Tr is calculated in the simple manner by the simple Equation (11) or by simple addition, not but in the complicated manner by the conventional complicated quadratic equation. Thus, the size of the microcomputor for calculating the tape position data can be reduced. Also, the microcomputer can cope with the tape position data calculation for many types of cassette tapes or many tape speed modes.

As described above, the present invention can provide an extremely preferable apparatus for indicating tape position data for cassette tape players.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A tape position data indicating apparatus for a cassette tape player wherein a tape is wound between a supply reel and a take-up reel comprising:
    reel driving means for rotating the take-up reel for transporting the tape from the supply reel to the take-up reel;
    detecting means for detecting a rotation period of either of the reels;
    calculating means responsive to the rotation period detected by the detecting means for obtaining an approximated tape position data according to a prescribed linear equation;
    means for indicating the approximated tape position data;
    means for storing prescribed constants associated with the linear equation; and
    means for supplying the prescribed linear equation constants stored in the storing means to the calculating means.

2. The apparatus of claim 1 wherein the calculating means carries out a linear equation expressed by:

$$Tr = \frac{Km - \alpha}{\beta}$$

where Km designates the rotation period detected by the detecting means, α designates an abscissa cross constant on the rotation period co-ordinate and β designates a slope constant.

3. The apparatus of claim 2 wherein the calculating means includes means for determining a type of the cassette tape in the cassette tape player.

4. The apparatus of claim 3 wherein the tape determining means includes a tape group determining means for determining a group to which the cassette tape in the cassette tape player belongs.

5. The apparatus of claim 4, wherein the group determining means includes means for reading out a prescribed data for designating the group.

6. The apparatus of claim 5 wherein the calculating means includes selecting means for selecting a rotation period range in which the detected rotation period falls.

7. The apparatus of claim 6 wherein the selecting means includes means for reading out a prescribed boundary data dividing the rotation range in the which the detected rotation period falls from another rotation period range.

8. The apparatus of claim 7 wherein the constant supplying means includes means for selecting prescribed linear equation constants associated with each rotation period range.

9. A tape position data indicating apparatus for a cassette tape player wherein a tape is wound between a supply reel and a take-up reel comprising:
   reel driving means for rotating the take-up reel for transporting the tape from the supply reel to the take-up reel;
   detecting means for detecting a rotation period of either of the reels;
   calculating means responsive to the rotation period detected by the detecting means for obtaining an approximated tape position data according to a prescribed linear equation expressed by:

$$Tr = \frac{Km - \alpha}{\beta}$$

where Km designates the rotation period detected by the detecting means, α designates an abscissa cross constant on the rotation period co-ordinate and β designates a slope constant; and
   means for indicating the approximated tape position data.

10. The apparatus of claim 9 wherein the calculating means includes means for determining a type of the cassette tape in the cassette tape player.

11. The apparatus of claim 9 wherein the calculating means includes selecting means for selecting a rotation period range in which the detected rotation period falls.

12. The apparatus of claim 11 wherein the selecting means includes means for reading out a prescribed boundary data dividing the rotation range in the which the detected rotation period falls from another rotation period range.

13. A tape position data indicating apparatus for a cassette tape player wherein a tape is wound between a supply reel and a take-up reel comprising:
   reel driving means for rotating the take-up reel for transporting the tape from the supply reel to the take-up reel;
   detecting means for detecting a rotation period of either of the reels;
   calculating means responsive to the rotation period detected by the detecting means for obtaining an approximated tape position data according to a prescribed linear equation expressed by:

$$Tr = \frac{Km - \alpha}{\beta}$$

where Km designates the rotation period detected by the detecting means, α designates an abscissa cross constant on the rotation period co-ordinate and β designates a slope constant;
   means for indicating the approximated tape position data;
   means for storing prescribed constants associated with each rotation period range; and
   means for selecting the prescribed linear equation constants stored in the storing means and supplying the selected constants to the calculating means.

14. In a cassette tape player wherein a tape is wound between a supply reel and a take-up reel, a method for indicating a tape position comprising:
   detecting a rotation period of one of the reels;
   calculating an approximated tape position data according to a prescribed linear equation expressed by:

$$Tr = \frac{Km - \alpha}{\beta}$$

where Km designates the rotation period detected by the detecting means, α designates an abscissa cross constant on the rotation period co-ordinate and β designates a slope constant in response to the rotation period of either of the reels; and
   indicating the approximated tape position data.

15. The method of claim 14 wherein the calculating step includes determining a type of the cassette tape in the cassette tape player.

16. The method of claim 14 wherein the step of calculating further includes the step of storing the prescribed constants associated with the linear equation.

17. The method of claim 14 wherein the calculating step includes selecting a rotation period range in which the detected rotation period falls.

18. The method of claim 17 wherein the step of calculating further comprises the steps of:
   storing the prescribed constants associated with each rotation period range; and
   selecting the stored linear equation constants according to the previously selected rotation period range.

* * * * *

UNITED STATES PATENT AND TRADEMARK OFFICE
CERTIFICATE OF CORRECTION

PATENT NO. : 4,996,611

DATED : February 26, 1991

INVENTOR(S) : Masahiro Ito

It is certified that error appears in the above-identified patent and that said Letters Patent is hereby corrected as shown below:

Claim 7, column 9, line 25, after "in" delete [the].

Claim 12, column 9, line 63, after "in" delete [the].

Signed and Sealed this

Twenty-seventh Day of April, 1993

Attest:

MICHAEL K. KIRK

*Attesting Officer*   *Acting Commissioner of Patents and Trademarks*